United States Patent [19]

Christian et al.

[11] 3,740,970

[45] June 26, 1973

[54] MOTOR TO SHAFT COUPLING TO PERMIT SELF-ALIGNMENT THEREBETWEEN

[75] Inventors: Donald K. Christian; Ronnie L. Stafford, both of Spartanburg, S.C.

[73] Assignee: Piedmont Engineering and Machine Company, Inc., Spartanburg, S.C.

[22] Filed: May 3, 1971

[21] Appl. No.: 139,594

[52] U.S. Cl. .................................... 64/31, 248/26
[51] Int. Cl. ............................................ F16d 3/04
[58] Field of Search .................... 64/27, 31; 248/15, 248/26

[56] References Cited
UNITED STATES PATENTS

| | | | |
|---|---|---|---|
| 2,885,142 | 5/1959 | Eberhart | 248/26 X |
| 1,923,879 | 8/1933 | Parsons | 248/26 X |

Primary Examiner—Edward G. Favors
Attorney—Wellington M. Manning, Jr.

[57] ABSTRACT

An improved self aligning coupling between a motor and an elongated shaft for direct driving of the shaft is disclosed. The improved system continuously permits self alignment between the motor and the driven shaft to drive said shaft without danger of damage to the motor. The motor drive shaft is rigidly keyed to the driven shaft while the motor per se is loosely secured to a support frame. The loose relationship between the motor and the frame is sufficient to produce torque while at the same time permitting limited motor movement for alignment purposes. Shock absorbers are provided for the motor to prevent damage thereto and to abate noise when torque is applied.

10 Claims, 5 Drawing Figures

INVENTORS
DONALD K. CHRISTIAN
RONNIE L. STAFFORD
BY
*Wellington M. Manning, Jr.*
ATTORNEY

PATENTED JUN 26 1973 3,740,970

INVENTORS
DONALD K. CHRISTIAN
RONNIE L. STAFFORD

BY *Wellington M. Manning Jr.*
ATTORNEY

MOTOR TO SHAFT COUPLING TO PERMIT SELF-ALIGNMENT THEREBETWEEN

BACKGROUND OF THE INVENTION

In the textile as well as other industries, long shafts or rolls are employed for the handling of wide widths of textile fabric and the like. A roll length of 200 or more inches is not unusual, for example. With a roll or shaft of such length, it is virtually impossible to journal opposite ends of the roll for rotation in a perfectly square manner such that the roll is perfectly aligned with respect to its supports. Moreover, it is likewise extremely difficult to produce perfect alignment between a drive shaft and the roll so as to permit direct driving of the roll by a motive power source.

When misalignment is experienced between the roll or driven shaft and the motor shaft, especially when a hydraulic motor is used, the working components of the motor will bind to the point where the motor may be damaged. As a result of the misalignment problems, bearings used in the support frame for the roll shaft are often self aligning bearings. Additionally, extensive effort has been expended in the area of developing a successful coupling for joining the motor shaft to the roll shaft which will compensate for misalignment between the shafts to prevent motor damage. To date, however, such efforts have not been successful, whereby constant problems persist where the misalignment between the shafts occurs, often when the equipment is quite new. The misalignment between the driven shaft and the drive shaft may occur initially when the machinery is fabricated or after use when one or more of the bearings become worn. Either occurrence is likely to cause the destruction of the motor.

The present invention overcomes the problem of original misalignment at the time of fabrication of the equipment between the drive shaft and the roll shaft as well as self alignment between the drive shaft and the roll shaft if and when the bearings become worn or for some reason the roll changes. The present invention thus provides a feasible solution to a long standing problem.

The present invention is not taught or suggested by the prior art which is exemplified by U. S. Pat. Nos. 2,258,460 to Dexter; 3,153,292 to Glasgow; 3,343,377 to Loupere; 3,379,135 to Kaatz; 3,434,303 to Leyer, and 3,477,251 to Martin.

SUMMARY OF THE INVENTION

It is an object of the present invention to provide a unique means of coupling a drive shaft to a driven shaft to permit self alignment between the driven shaft and the drive means.

Another object of the present invention is to provide a coupling between a motor and an elongated roll that is self aligning.

Still further, another object of the present invention is to provide a roll drive system for a textile machine where the roll is directly driven and where the drive means is self aligning with respect to the roll.

Generally speaking, the present invention relates to a self aligning motor and shaft arrangement comprising a support frame; an elongated shaft journaled for rotation in said frame; and a direct drive means for said shaft, said drive means being directly connected to said shaft and being secured to said frame for limited movement with respect thereto, said motor further having shock absorber means associated therewith with respect to said frame.

More specifically, the present invention teaches a support frame where one end of an elongated shaft is journaled for free rotation while the opposite end of said shaft is directly connected to the drive shaft of a motor, preferably a hydraulic motor. The driven shaft extends through a portion of the frame and is preferably keyed to the drive shaft of the motor. The portion of the frame immediately adjacent the motor is provided with at least one receiving opening in which a flanged torque plate is received, said torque plate being slightly smaller in size than said receiving opening and having a resilient member at least partially therearound. The torque plate has a shoulder and a threaded element extending outwardly therefrom. The shoulder of the torque plate passes loosely through an opening in the frame and abuts a motor mounting flange. The threaded element extends through an opening therefor in the motor flange and is secured therein by a nut or the like. The motor is thus rigidly secured to each torque plate while limited movement of the motor is permitted due to the size of the receiving opening within the frame.

The present invention is ideally suited for hydraulic motors since a hydraulic motor is quite susceptible to damage in the event of misalignment between the driven shaft and the drive shaft without adequate compensation therefor. When, however, the motor is permitted to move by limited amounts as taught herein, motor damage is minimized. Hence, once the equipment is fabricated and the motor actuated, the driven shaft and the drive shaft of the motor will seek a pure alignment therebetween and will maintain that alignment. Moreover, as mentioned above, in the event that the support bearing for the shaft becomes worn during use, and further misalignment is experienced, the motor drive shaft and driven shaft will again seek a pure alignment and continue to function properly.

The portion of the support frame for receiving the motor and driven shaft according to the teachings of the present invention is ideally tubular. The preferred tubular support member is bored to receive the various members passing therethrough. Within the tubular support member, means must be provided for securing the member therein and/or providing the limited movement capability therefor. Individual fastening members may be used and receiving openings fabricated on the inside of the tubular member or a single element may be prepared to accomplish these purposes. This mounting arrangement may be modified in numerous ways. For example, separate parallel mounting plates could be used in lieu of the tubular member.

DESCRIPTION OF THE PREFERRED EMBODIMENTS

Figure 1:
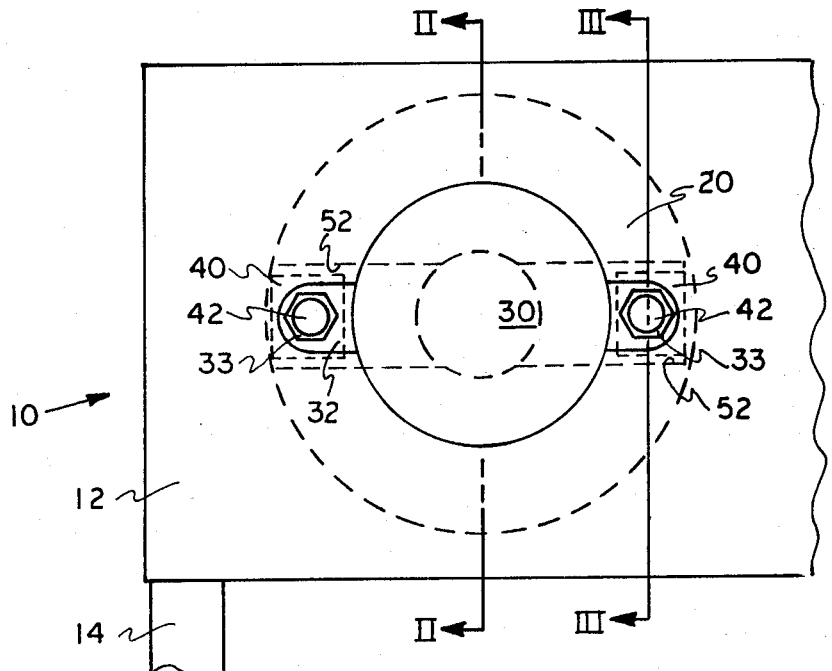
FIG. 1 is an end view of a portion of a support frame showing a drive motor mounted thereon according to the teachings of the present invention and secured to an elongated shaft that is journaled for rotation on said support frame.
Figure 3:
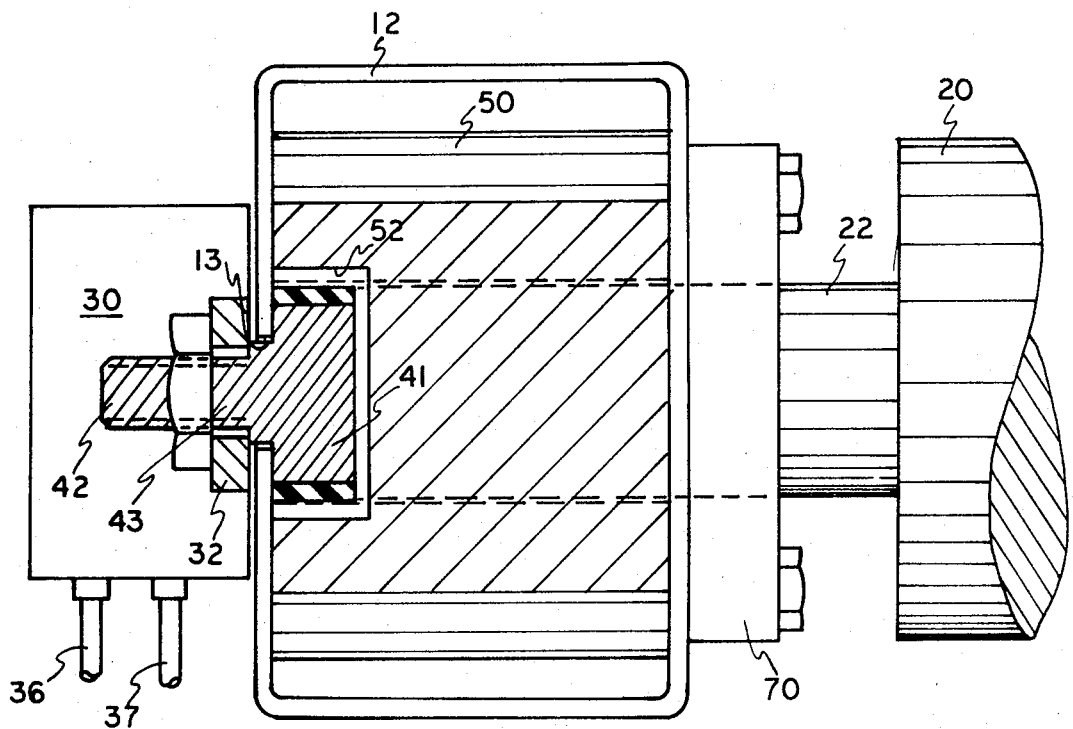
FIG. 3 is a vertical cross sectional view of FIG. 1 taken along lines III—III and showing the mounting of the drive motor to the supporting frame according to the teachings of the present invention.
Figure 5:
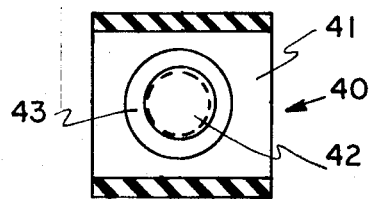
FIG. 5 is a top plan view of a flanged torque plate according to the teachings of the present invention.

Referring to the Figures, specific embodiments of the present invention will now be described in detail. In FIG. 1, a support frame generally indicated as 10 is shown in part. Such a frame could, for example, be provided in a textile environment for one or more long rolls which are supported for rotation and are directly driven by a drive means, said rolls being subject to undergo misalignment with respect to the drive means. The support frame 10 is shown to include a tubular mounting panel 12 and one of a number of legs 14. The remainder of the support frame is not illustrated since it would be considered to be well within the purview of one skilled in the art to construct a suitable frame for supporting the elongated roll or shaft. Shown in phantom on tubular mounting panel 12 is a roll 20 which would be directly driven from the end of the frame shown and journaled for free rotation in the opposite end of the support frame (not shown). A drive means, such as a hydraulic motor 30, is shown secured to tubular panel 12 by a motor flange 32 and outwardly projecting threaded elements 42 of torque plates 40. Torque plate 40 resides loosely within a slotted receiving opening 52 in a connecting element 50 as will be described in more detail hereinafter and as best seen in FIGS. 3 and 5.

Figure 2:
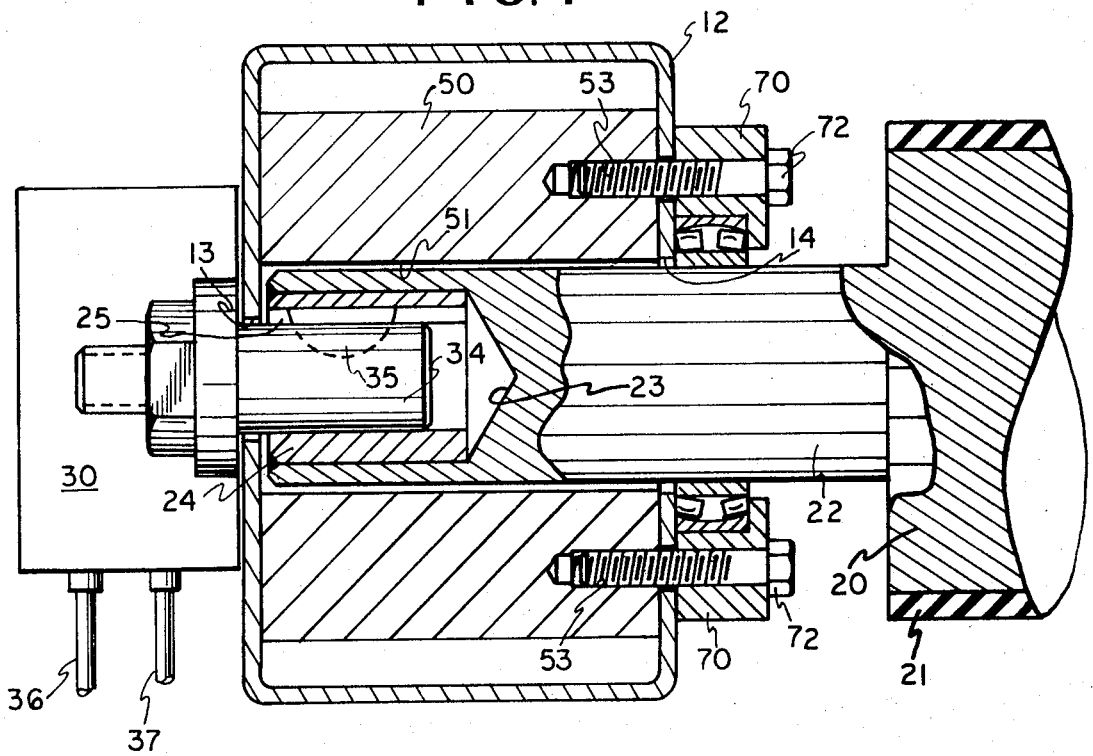
FIG. 2 is a vertical cross sectional view of FIG. 1 along lines II—II showing a portion of driven shaft and the direct coupling of the driven shaft to a motor drive shaft according to the teachings of the present invention.
Figure 4:
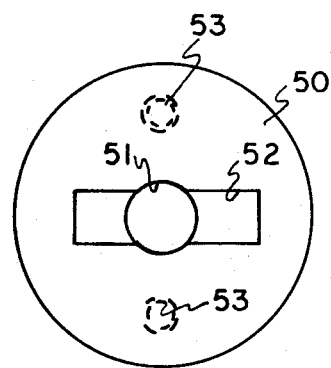
FIG. 4 is an end view of an internal element of the supporting frame according to the teachings of the present invention.

Referring to FIG. 2, a roll 20 is shown having a cover 21 which is optional depending upon the use for the roll. Roll 20 is provided with a shaft 22 extending outwardly from opposite ends thereof (only one end shown). An end of shaft 22 that is to be driven is counterbored to provide an axial opening 23 for a portion of the length thereof. A collar 24 is fitted within opening 23 and has a keyway 25 cut along the full length thereof. Collar 24 is rigidly secured within opening 23 such as by welding or the like to provide a unitary structure between collar 24 and shaft 22. Tubular panel 12 is provided with openings 13 and 14 on opposite sides thereof with the opening 13 on the motor side of the panel being of a shape similar to the motor flange, but of smaller dimensions. A solid connecting element 50 is provided within tubular mounting panel 12 and has a central opening 51 extending therethrough, opening 51 being larger in size than the diameter of roll shaft 22 (See FIG. 4). On the motor side of connecting element 50, a rectangular slot 52 is provided across central opening 51 and extending outwardly from both sides thereof, slot 52 being larger in size than the corresponding panel opening 13 on mounting panel 12. The opposite end of connecting element 50 is provided with taps 53, the purpose of which will be discussed hereinafter. A motor 30, such as a hydraulic motor, is positioned on the outside of panel 12 with the motor drive shaft 34 extending into the center of opening 13 on panel 12 and into central opening 51 of connecting element 50. Drive shaft 34 is directly connected to driven shaft 22 by keying or any other suitable method. Hence shaft 34 passes into driven shaft 22 through collar 24 where a key 35 extends from drive shaft 34 into keyway 25 of collar 24. The drive shaft of motor 30 is thus rigidly connected to the shaft 22 of roll 20. The shaft 22 of roll 20 passes through opening 14 of panel 12 and is supported by and journaled for rotation in a self aligning bearing 70 which is secured to mounting plate 12 by bolts 72. Bolts 72 extend through the outer surface of mounting plate 12 and into the taps 53 of connecting element 50. Thus the weight of roll 20 is supported by the support frame 10 and not by the motor 30.

As mentioned earlier, motor 30 is mounted to the support frame so as to permit limited movement of motor 30 relative to support frame 10. Referring to FIG. 3, the motor 30 is shown loosely mounted to the support frame 10. Referring again to FIG. 4, connecting element 50 is provided with rectangular slots 52 extending outwardly from both sides of central opening 51. The size of slots 52 is slightly larger than the side extension of opening 13 in mounting plate 12. A torque plate 40 having an enlarged flange 41, a shoulder 43 and an elongated threaded element 42 is received in each slot 52. A resilient element 44 is provided at least partly around flange 41 of torque plate 40 to absorb shock experienced between plate 40 and connecting element 50 during actuation of motor 30 and to abate any noise produced thereby. Torque plate 40 thus resides within rectangular slot 52 and extends loosely through opening 13 in mounting plate 12 as shoulder 43, where the flange plate 32 of motor 30 passes around element 42 and abuts shoulder 43. Flange plate 32 of motor 30 engages shoulder 43 of torque plate 40 so as to produce a rigid connection therebetween. Shoulder 43 of torque plate 40 extends just beyond the end of mounting plate 12 so as to provide small clearance between the motor 30 and the face of mounting plate 12. When a desired number, normally two, torque plates 40 are secured to motor 30 with the flanges 41 residing loosely within slots 52 of connecting element 50, motor 30 is adequately supported by the support frame 10 while at the same time being permitted limited movement with respect thereto. The oversized openings in connecting element 50 and panel 12 determine the limits of movement of motor 30 while seeking alignment with driven shaft 22.

Motor 30 as mentioned above, is preferably a hydraulic motor and thus hydraulic lines 36 and 37 are illustrated. Though not shown, hydraulic lines 36 and 37 are associated with a suitable hydraulic system for operating motor 30. Motor 30 as mentioned earlier may suitably be any type of motor and a specific description thereof is thus not presented herein.

Operatively speaking, with the preferred arrangement as hereinbefore described, when hydraulic fluid is pumped into the motor 30 through a hydraulic line 36 and the drive shaft 34 of motor 30 is caused to rotate due to the motive power produced, the drive shaft 34 and motor 30 seek pure alignment with the shaft 22 of roll 20. Motor 30 thus moves with respect to support frame 10 by virtue of the oversized opening 13, slots 52, central opening 51 and the like, whereby no binding is experienced by motor 30. Additionally, as bearings 70 wear and roll 20 is again subject to misalignment with respect to the motor 30 and drive shaft 34, further motor movement is permitted which again enables the elements to seek pure alignment therebetween.

While the present invention has been described with respect to a directly driven roll for a textile application, such an arrangement could likewise be permitted for producing direct rotational movement to any elongated member in a vertical or a horizontal disposition. Likewise, whereas supporting element 50 has been shown in the Figures as a solid member, obviously such is not necessary and other means could be incorporated into the support frame 10 so as to rotatably support the roll shaft 22 and to which the motor 30 could be secured for limited movement.

Having described the present invention in detail, it is obvious that one skilled in the art will be able to make modifications and variations thereto without departing from the scope of the invention. Accordingly, the present invention should be determined only by the claims appended hereto.

What is claimed is:

1. A self-aligning drive motor and driven shaft arrangement comprising:
   a. a support frame;
   b. an elongated driven shaft journaled for rotation in said frame and supported thereby; and
   c. a direct drive means for said shaft, said drive means being rigidly connected to said shaft and being loosely secured to said frame to permit limited movement of said drive means with respect to said frame, said drive means further having shock absorber means associated therewith with respect to said frame, whereby said shaft and said motor remain in alignment during limited lateral movement of said shaft.

2. A self aligning drive motor and driven shaft arrangement as defined in claim 1 wherein said elongated driven shaft is a roll.

3. A self aligning drive motor and driven shaft arrangement as defined in claim 1 wherein said direct drive means is a hydraulic motor.

4. A self aligning drive motor and driven shaft arrangement as defined in claim 1 wherein said driven shaft is rigidly keyed to a drive shaft of said drive means.

5. A self aligning drive motor and driven shaft arrangement as defined in claim 1 wherein said support frame has at least one torque plate receiving opening thereon, and wherein a torque plate loosely resides in said opening and extends outwardly therefrom where it is rigidly secured to said drive means.

6. A self aligning drive motor and driven shaft arrangement as defined in claim 1 wherein said support frame is a textile material handling machine.

7. A self aligning drive motor and driven shaft arrangement as defined in claim 1 wherein the driven shaft is journaled for rotation in self aligning bearings mounted on said frame, said shaft is rigidly keyed to a drive shaft of said drive means, and at least one torque plate is loosely received on said frame, said torque plate being rigidly secured to said drive means to permit the production of torque while permitting limited movement of said drive means with respect to said frame to achieve alignment between said drive means and said driven shaft.

8. A self aligning drive motor and driven shaft arrangement as defined in claim 7 wherein said drive means is a hydraulic motor.

9. A self aligning drive motor and driven shaft arrangement as defined in claim 7 wherein said support frame is a textile material handling machine.

10. A self aligning drive motor and driven shaft arrangement as defined in claim 9 wherein said textile material handling machine is a winding machine.

* * * * *